M. ORTON.
METHOD OF PRODUCING THEATRICAL ILLUSIONS.
APPLICATION FILED MAY 8, 1917.

1,262,553.

Patented Apr. 9, 1918.
2 SHEETS—SHEET 1.

Inventor
Myron Orton.
By his Attorney
Jas. H. Griffin

M. ORTON.
METHOD OF PRODUCING THEATRICAL ILLUSIONS.
APPLICATION FILED MAY 8, 1917.
1,262,553.
Patented Apr. 9, 1918.
2 SHEETS—SHEET 2.
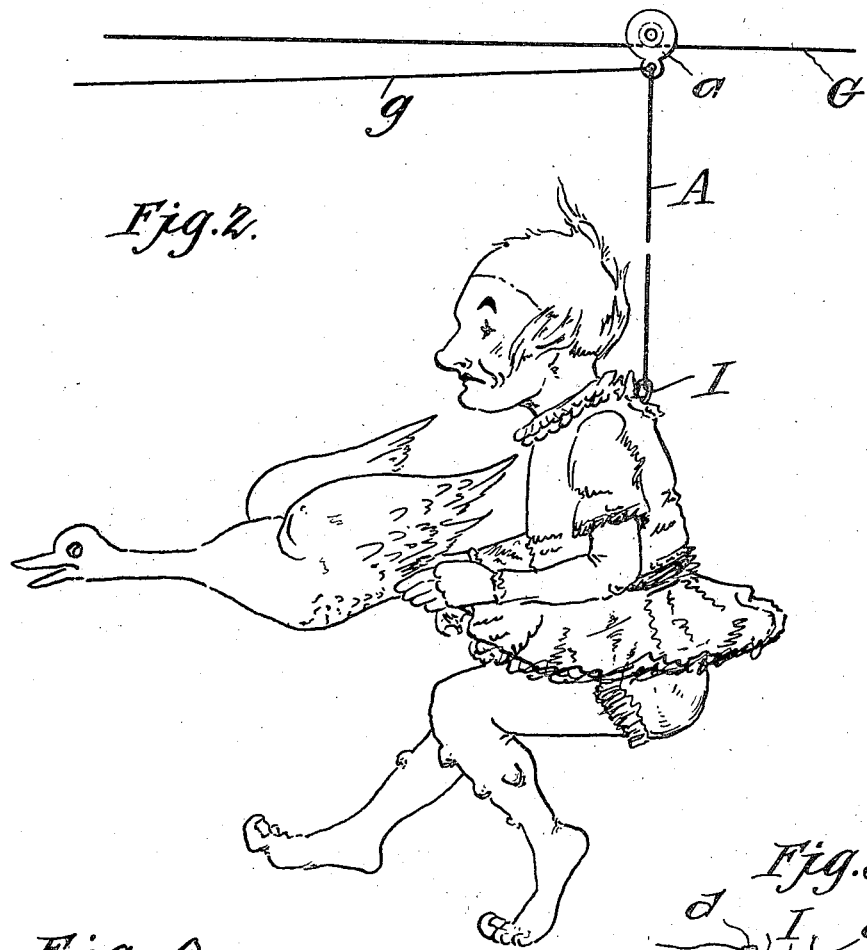
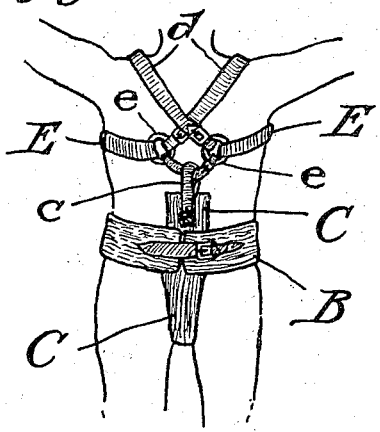
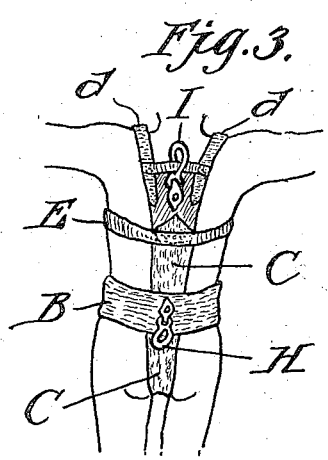
Inventor
Myron Orton.
By his Attorney
Jas. H. Griffin.

UNITED STATES PATENT OFFICE.

MYRON ORTON, OF VINELAND, NEW JERSEY.

METHOD OF PRODUCING THEATRICAL ILLUSIONS.

1,262,553.

Specification of Letters Patent. Patented Apr. 9, 1918.

Application filed May 8, 1917. Serial No. 167,170.

*To all whom it may concern:*

Be it known that I, MYRON ORTON, a citizen of the United States, residing in Vineland, county of Cumberland, and State of New Jersey, have invented a certain new and useful Method of Producing Theatrical Illusions, of which the following is a specification.

This invention is a method of producing theatrical illusions, and is directed, more particularly, to a method whereby an audience may be induced to believe, through deception, that an artist on a stage is being drawn through space by an animate creature and maintained above the floor or stage, against gravity, by such creature, independent of any mechanical assistance.

In the preferred manner of practising the invention, the performer or artist is actually suspended on a fine wire, the upper end of which is either secured to a fixed support or mounted for movement along a trolley, the method being to move the artist across and above the stage on such suspending means, while he or she grasps a flying bird, preferably of such size and power as to lend plausibility to the act. The impression received by the audience is that the flying bird is actually carrying the artist through the air, independently of any mechanical support.

It is well recognized by theatrical artists that acts utilizing trained animals are always fascinating to an audience, but such acts have always been confined to bipeds or quadrupeds having little or no capacity for flight. More or less startling effects have also been produced by despatching doves or similar small birds with visible messages attached to their legs. In all these acts, however, no attempt was made to make it appear, by illusion or otherwise, that the animals or birds were actually doing anything which commanded anything more than the admiration or approval of the audience or aroused its pleasurable interest.

The present invention, however, in pronounced contradistinction, causes a thrill in the audience because of the realistic appearance of a flying animal or bird accomplishing the almost superhuman feat of carrying along a performer of many times its own weight and entirely unaided by any mechanical means or assistance.

Moreover, it has long been the practice to support artists or performers above the stage on invisible supports, and, in many cases, chorus girls have been caused to swing out over the audience on a fine wire, to produce spectacular effects. However, in these acts, no doubt was left in the mind of the audience as to the suspension means, it being apparent, on the face of the act, that there was some tangible means of support, even though invisible. The present invention has an air of plausibility and conveys to the audience the effect that the bird is actually supporting and carrying the performer in its flight.

In the accompanying drawings, I have illustrated different practical means for carrying out the method of this invention and the manner of their use, but it will be understood that said showing is for the purpose of illustration, only, and does not define the limits of the invention.

Fig. 2 illustrates the artist in another posture.

Fig. 3 is a partial back view of a person, illustrating the manner in which certain harness which I prefer to employ may be attached to the person, and Fig. 4 is a front view of the same person, with the same harness in place.

Figure 1:
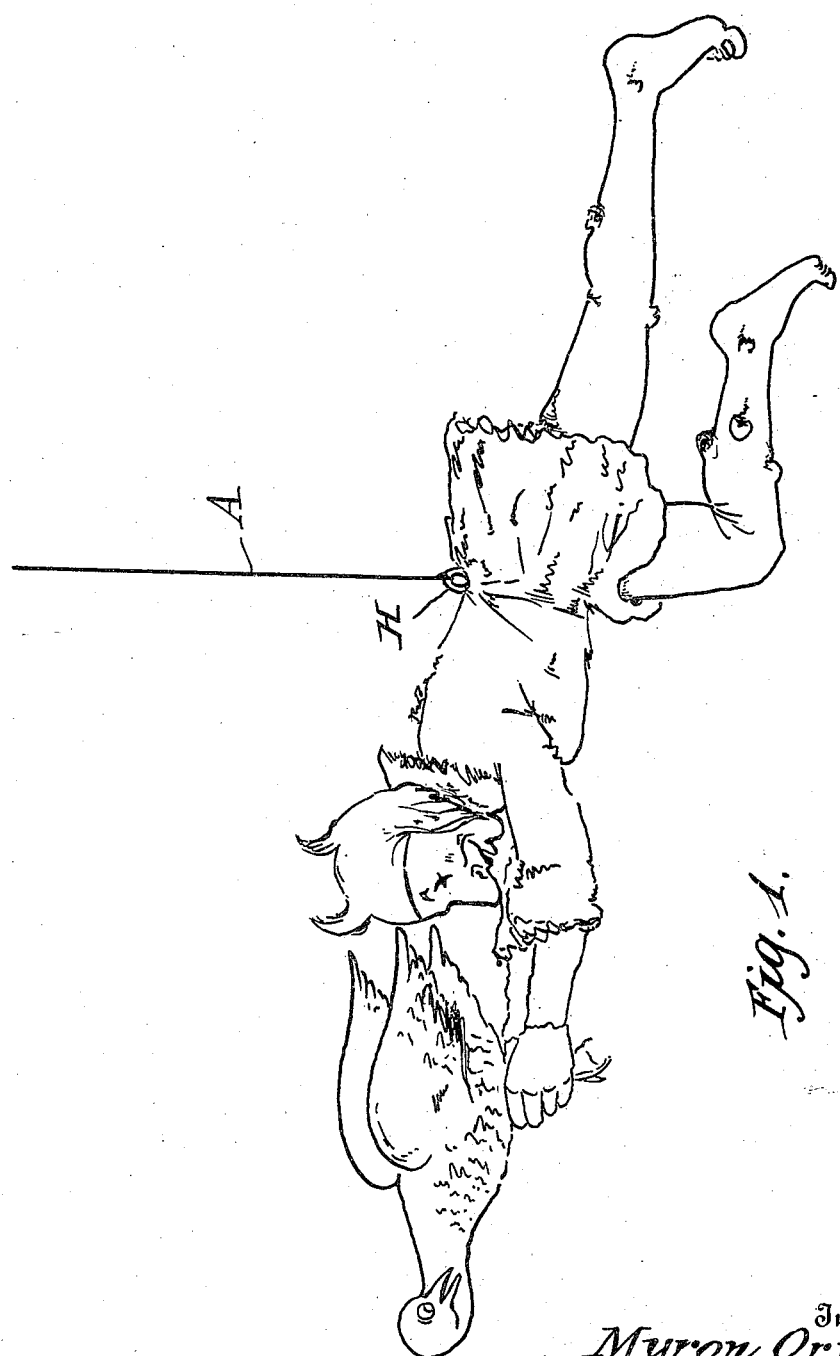
Figure 1 shows the preferred manner of carrying out the present invention, the artist being here shown in one posture.

The preferred manner of practising the invention is illustrated in Fig. 1 of the drawings, wherein the artist is shown as suspended from a wire A, secured substantially at the belt line. The suspending of the artist at this point causes him to partake of the prone position shown.

The lower end of supporting wire A may be secured to the artist in any suitable way, but I have shown in Figs. 3 and 4 of the drawings, a harness which I recommend for this purpose, it being found that this particular type of harness is extremely comfortable in use, is durable, and will support the artist with great efficiency. The harness shown embodies a belt B, the ends of which are adapted to be buckled together at the front, as shown in Fig. 4. Passing beneath the crotch of the wearer, and upwardly at the front and back beneath belt B, is a wide band of material, provided at the front upper end with a loop $c$, and at the back upper end with a pair of shoulder straps $d$, adapted to be passed over the shoulders and, after crossing one another, be secured to rings e. Said rings are tied together by a strap f, passing through said rings and through loop c at the front of band C, while also secured to said rings is a chest strap E, which is passed from one ring e, around the sides and chest of the wearer, and secured to the other ring. The chest strap E is precluded from sliding down in the back by sewing or otherwise securing the same to the band C, as shown in Fig. 3.

Secured to the rear of the belt, at about the waistline, is an attaching ring H, and near the upper rear end of band C is a second attaching ring I. When it is desired that the artist shall occupy the prone position of Fig. 1, supporting wire A is secured at its lower end to attaching ring H, while, if it is desired that said artist shall occupy an erect or sitting posture, such as shown in Fig. 2, wire A is secured to upper ring I. In either event, the artist is entirely supported through the medium of wire A.

The upper end of wire A may be either secured to a fixed support high up in the flies, or attached to a trolley after the manner shown in Fig. 2, wherein said wire is shown as secured to a pulley a, mounted for travel along a cable G, a pull rope g being provided to impart movement to the pulley a along the cable G. In practice, cable G may be inclined so that pulley a will glide along the same by gravity, in which case pull rope g is unessential.

When carrying out the method of the present invention by the means shown in Fig. 2, the artist takes his position in the wings of the stage, preferably grasping the legs of a goose, whereupon his confederate operates pull rope g to draw the artist across the stage and above the surface thereof. It is found in practice that, as soon as the artist grasps the goose as described, said bird immediately begins to flap its wings, in an endeavor to free itself from the artist's grasp, and, frequently, considerable sqawking accompanies its futile efforts. The act is generally so timed that the confederate begins to operate the pull rope as soon as the artist has grasped the bird, so that the artist is rapidly moved across the stage before the bird has quieted down.

The effect upon the audience is both mystifying and ludicrous. The sight of the bird flapping its wings and squawking across the stage, with the artist in tow, either in the upright position of Fig. 2 or the prone posture of Fig. 1, is a most funny and laughable sight, and conveys the impression to the audience that the artist is actually being carried through the air by the bird, so that the act is, in every instance, greeted with loud applause and laughter. In carrying out the act, the artist generally moves his feet while in the position of Fig. 2, or simulates a swimming movement if in the posture of Fig. 1. The passage of the artist across the stage rearwardly of the proscenium is rather rapid, and suspending wire A is of such small diameter that its size, coupled with the movement, renders it invisible to the audience and makes the deception complete.

In carrying out the method, the artist may be suspended on a trolley, as described, or the upper end of wire A may be secured to a fixed ring high up in the flies, in which latter case the artist would simply swing across the stage on a radius of the length of the wire.

In the preferred manner of practising the invention, a live goose is used, as this bird is quite large and powerful, and plausibility is thereby lent to the act. It will be understood, however, that propelling means, other than a goose or some other kind of bird, might be employed, without departing from the spirit of the invention, and still convey the same effect to the audience, namely, that the performer is being dragged through the air by visible locomotive force. The present invention is not, therefore, restricted to the specific showing made, but is as broadly novel as is commensurate with the appended claims.

Having thus fully described the invention, what I claim as new, and desire to secure by Letters Patent, is:

1. The hereindescribed method of illusioning a theatrical audience into believing that an artist is being carried along by a flying bird which consists in suspending the artist from an invisible support while grasping the legs of the bird and then rapidly moving the support across the stage, whereby the bird has free movement of its wings and apparently is in flight.

2. The hereindescribed method which consists in rapidly moving an artist across and above a stage on a mechanical support invisible to the audience while the artist supports and carries before him a flying creature, whereby the audience is illusioned into believing that the artist is being supported and towed along by the flying creature.

3. The hereindescribed method which consists in an artist swinging across and above a stage on an invisible support while grasping a flying creature, whereby an audience is illusioned into believing that the artist is being supported and towed along by the flying creature.

4. The hereindescribed method which consists in suspending an artist on an invisible support and rapidly moving said artist across and above a theatrical stage while the artist grasps a flying creature and holds it in front of him, whereby the audience is illusioned into believing that the artist is being supported and towed along by the flying creature.

5. The hereindescribed method which consists in mechanically supporting an artist above the floor of a stage in such manner that the supporting means is invisible to the audience, and rapidly moving the artist across the stage while so supported, the artist grasping a flying creature with outstretched arms during such movement for the purpose of illusioning the audience into believing that the artist is being carried along by the flying creature.

In testimony whereof I have signed my name to this specification.

MYRON ORTON.

Copies of this patent may be obtained for five cents each, by addressing the "Commissioner of Patents, Washington, D. C."